United States Patent
Kremer et al.

[11] Patent Number: 5,846,501
[45] Date of Patent: Dec. 8, 1998

[54] PROCESS FOR THE SELECTIVE RECOVERY OF THE SALT CONSTITUENTS FROM USED HARDENING SHOP SALTS WHICH CONTAIN NITRITE-NITRATE

[75] Inventors: Matthias Kremer, Wiesbaden; Georg Wahl, Rodenbach; Eberhard Gock, Goslar; Stefan Wigger; Jörg Kähler, both of Clausthal-Zellerfeld, all of Germany

[73] Assignee: Durferrit GmbH Thermotechnik, Mannheim, Germany

[21] Appl. No.: 840,239

[22] Filed: Apr. 11, 1997

[30] Foreign Application Priority Data

Apr. 13, 1996 [DE] Germany ............ 196 14 645.3

[51] Int. Cl.⁶ .................. C22B 26/20; C22B 26/10
[52] U.S. Cl. .............. 423/165; 423/194; 423/184; 423/202; 23/299; 23/302 R; 23/303
[58] Field of Search ............ 423/165, 194, 423/184, 202; 23/299, 302 R, 303; 241/15, 17

[56] References Cited

U.S. PATENT DOCUMENTS

| | | | |
|---|---|---|---|
| 1,194,465 | 8/1916 | Bassett | 423/194 |
| 1,300,947 | 4/1919 | Freeth | 423/194 |
| 1,516,550 | 11/1924 | Smith | 423/194 |
| 1,517,046 | 11/1924 | Burdick | 423/194 |
| 1,915,428 | 6/1933 | Lambert | 423/194 |
| 2,024,370 | 12/1935 | Kaselitz | 423/194 |
| 3,096,034 | 7/1963 | Schmidlapp | 241/15 |
| 3,949,052 | 4/1976 | Muller et al. | 423/155 |
| 3,953,571 | 4/1976 | Muller et al. | 423/165 |
| 4,776,930 | 10/1988 | Bianchi et al. | 23/302 R |
| 4,797,981 | 1/1989 | Ninane et al. | 23/303 |

FOREIGN PATENT DOCUMENTS

| | | |
|---|---|---|
| 2400318 | 7/1975 | Germany. |
| 2400319 | 7/1975 | Germany. |
| 1721016 | 3/1992 | U.S.S.R. ............ 423/194 |

OTHER PUBLICATIONS

Wigger, Stefan, et al., "Recycling Chloridischer Härtereisalt-salze Recovery of Waste Salts from Heat Treating Facilities," Erzemetall, vol. 49, Jul., 1996, pp. 455–462.

*Primary Examiner*—Steven Bos
*Attorney, Agent, or Firm*—Beveridge, DeGrandi, Weilacher & Young, LLP

[57] ABSTRACT

In order to recover in an environmentally sound and economic manner used hardening shop salts which contain nitrate-nitrite, the salts, comminuted to particle sizes of from 1 to 50 mm, are dissolved in a mixture of nitric acid and hydrogen peroxide without nitrogen oxides arising, and, by evaporation and cooling, potassium nitrate, sodium chloride, and sodium nitrate are obtained sequentially by fractional crystallization.

14 Claims, 1 Drawing Sheet

PROCESS FOR THE SELECTIVE RECOVERY OF THE SALT CONSTITUENTS FROM USED HARDENING SHOP SALTS WHICH CONTAIN NITRITE-NITRATE

INTRODUCTION AND BACKGROUND

The invention relates to a process for the selective recovery of the salt constituents from used salts which contain nitrite-nitrate-hydroxide, which arise in heat treatment of steel components in salt baths, comprising dissolution of the used salts in water, separation of the insoluble residue and fractional crystallization of the alkali metal nitrates.

Heat treatment processes have long been used to increase the hardness of steel or its resistance to wear. Salt bath technology, in which the workpieces are treated in fused salts, occupies an important position in the technology of wear protection. Salt baths which contain nitrite-nitrate-hydroxide are used for cooling components, in particular following treatment in carburization baths. The principal components of the latter salt baths are nitrites, nitrates and hydroxides of the alkali metals sodium and potassium. They normally contain additionally smallish quantities of barium and chlorides and sizeable quantities of carbonates. Cyanide salts adhering to the steel components are oxidized in these fused salts, thus increasing significantly the resistance of the steels to corrosion. The particularly favorable cooling rate in these baths affords particularly high strength and hardness values. The baths must be desludged and replenished with fresh salt at regular intervals because the fused salts become contaminated with particles of the scale which spalls off the workpiece surface, and the active constituents of the salt bath are spent as a result of the chemical reactions. This sludge still comprises from 50 to 99 percent salt constituents and must be disposed of as used salt in underground waste disposal sites.

These used salts have not hitherto been regarded as economically recoverable, such that the main emphasis of efforts to alleviate the used salt problem has been concentrated on improving disposability to waste sites and on destruction of some toxic components.

Initial progress towards achieving partial recovery of the salt constituents from used hardening shop salts has been described, for example, in the journal CAV 45 (1973), pp. 69–75 and in Chemie-Ing.-Technik 45 (1973), pp. 1285–1289. These processes provide for a simultaneous treatment of nitrate-containing and cyanide-containing used salts. In this case the intention is to detoxify the cyanide in the fused salt by reaction with nitrites and nitrates, and to break down excess nitrite and nitrate by the addition of lean coal. It is then possible in a subsequent dissolving process to separate barium carbonate from the other, soluble, salts. The crucial disadvantage of these processes is that cyanide detoxification in the salt bath carries the risk of an explosive reaction, in particular when the cyanide content passes the 5 percent threshold, as is the case with some bath types. Barring a major investment in analytical equipment, therefore, it is possible only with difficulty to control the progress of the reaction. Furthermore, toxic exhaust gases ($NO_x$ and CO) arise in this reaction, and these must be eliminated by, for example, catalytic combustion. No information is supplied as to recovery of the high salt load carried by the waste water which arises in the further process step in which barium carbonate is precipitated.

DE-OS 24 00 318 and DE-OS 24 00 319 disclose the partial recovery of salt constituents from used hardening shop salts. After the cyanide detoxification, which is carried out in the fused salt at from 450° to 550° C., the used salt is leached with hot water. The residue which comprises for a large part barium carbonate is separated and is passed for further processing, for example into barium chloride. The dissolved carbonate is converted to carbon dioxide by the addition of nitric acid, and the chloride content is reduced to 10 to 15 wt. % by evaporating the water, enabling sodium chloride to be obtained as a crystalline product. The remaining solution is dried at 160° C., and the salt mixture of nitrate and nitrite, plus two percent sodium chloride and potassium chloride, should be reusable directly in hardening shops. This process, however, also has disadvantages which have prevented the implementation of the reaction on a large industrial scale. For instance, the addition of the nitric acid gives off sizeable quantities of $NO_x$ gases which must be eliminated by catalytic combustion. Introducing barium nitrate into the solution in order to circumvent the addition of acid, on the other hand, entails an additional process step. In particular, the degrees of purity of the salts obtained fall short of the requirements for raw materials for preparing hardening salts, and purity is highly dependent on the composition of the used salt feedstock, which is subject to marked fluctuation. Nor is direct reuse possible of the nitrate-nitrite salt obtained, owing to its variable composition, particularly as the residual chloride concentration does not meet the technical requirements. The use of regenerators in the past has moreover brought about changes in the composition of the used salts which arise, with cyanide and carbonate contents tending to be lower and chloride contents higher. The process described cannot meet these changed basic conditions without additional process steps.

Processes to separate alkali metal chlorides are known per se, however they are not directly translatable to alkali metal nitrate recovery from used hardening shop salts, because in this case non-uniform starting product compositions must be expected, and different process conditions must be respected.

One object of the present invention is therefore to find a process for the selective recovery of the salt constituents from used salts which contain nitrite-nitrate-hydroxide, which arise in heat treatment of steel components in salt baths, comprising dissolution of the used salts in water, separation of the insoluble residue and fractional crystallization of the alkali metal nitrates, which is simple to carry out and affords high yields of directly reusable salts.

SUMMARY OF THE INVENTION

In achieving the above and other objects, a feature of the invention is a process for the selective recovery of salt constituents from used salts containing nitrates, nitrites, and hydroxides comprising comminuting a solid used salt mixture to a particle size from 1 to 50 mm, dissolving the comminuted used salt mixture in an aqueous starting solution comprising nitric acid and hydrogen peroxide at from 40° to 90° C. to form a used salt solution, removing insoluble residue from the used salt solution, cooling the used salt solution to from −10° C. to +20° C. to form a potassium nitrate precipitate, evaporating water from the used salt solution at from 60° to 120° C. to concentrate the used salt solution and to form a sodium chloride precipitate, and adding concentrated nitric acid to the concentrated used salt solution to form a sodium nitrate precipitate.

A further feature of the invention further includes, before or after removing the insoluble residue, adding to the used salt solution a carbonate and an alkali to form a slightly alkaline used salt solution and to form a barium carbonate precipitate.

BRIEF DESCRIPTION OF THE DRAWINGS

The present invention will be further understood with reference to the drawing, wherein.

DETAILED DESCRIPTION OF THE INVENTION

Figure 1:
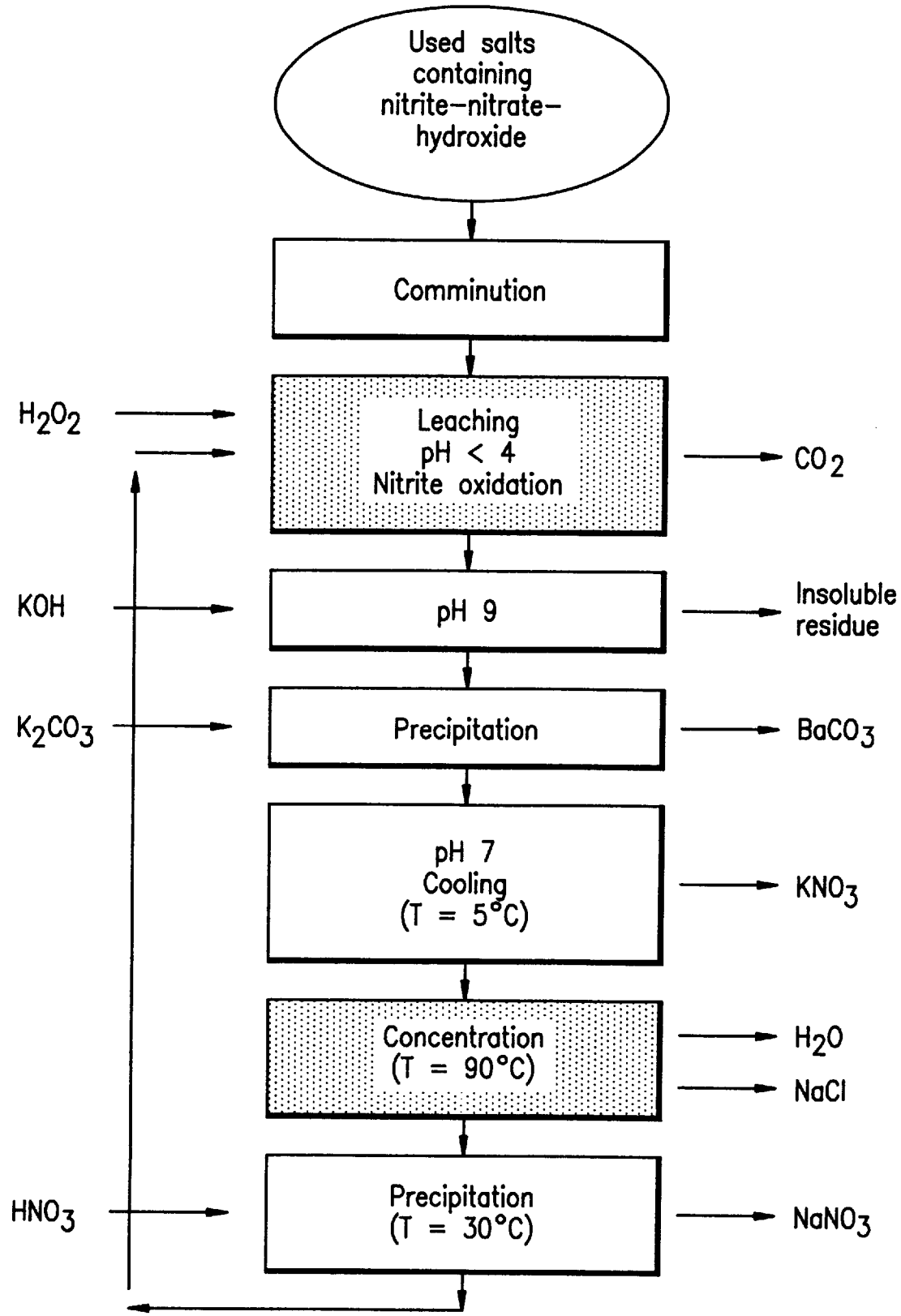
FIG. 1 is a flow chart for the process according to the invention.

In accordance with more detailed aspects of the present invention, the process for recovering the solid used salts comprise comminuting the salts to a particle size of from 1 to 50 mm, and dissolving the salts at from 40° to 90° C. in a solution containing nitric acid and hydrogen peroxide. After the insoluble residue has been filtered off, potassium nitrate is precipitated by cooling the concentrated, neutralized salt solution to from −10° to +20° C.; sodium chloride is crystallized out by further concentrating the solution at from 60° to 120° C.; and sodium nitrate is crystallized out of the residual solution by the addition of concentrated nitric acid.

Advantageously, after the used salts have been dissolved any barium which is present is precipitated out as barium carbonate by the addition of carbonate and alkali in a slightly alkaline medium, and is separated.

The used salts are preferably comminuted to a particle size of from 5 to 10 mm.

It has been found that following comminution to a particle size of from 1 to 50 mm, advantageously from 5 to 10 mm, of the solid used hardening shop salts which contain nitrite-nitrate-hydroxide, the salt constituents are dissolved completely by leaching in a starting mixture containing nitric acid and hydrogen peroxide. This process simultaneously oxidizes the nitrite ions to nitrate and neutralizes carbonate and hydroxide, with the formation of nitrate salts. As a result of the presence of hydrogen peroxide in the starting mixture, contrary to expectations, when the nitrite salt is introduced in the form of coarse granules, as it contacts the starting mixture containing nitric acid no $NO_x$ gas is given off. This result is explained by the relatively small reaction surface area and the instantaneous further reaction between $NO_x$ gases arising in the solution and the hydrogen peroxide. This combination of reagents in the solution furthermore ensures that cyanide-containing salt which may be incorrectly marked is detoxified by reaction with the nitrite and the hydrogen peroxide without causing problems. The process can be controlled by monitoring the pH and measuring the redox potential. A further advantage is that the reaction heat liberated by the oxidation and neutralization offsets the endothermic dissolution process. As a result a solution temperature of from 50° to 80° C. is adjusted, which enables a very high salt concentration to be achieved. Thus, between 100 and 200 kg nitrate-containing used salt can be dissolved in a starting mixture of 50 kg 65% nitric acid and 50 kg 50% hydrogen peroxide solution.

Any barium which is present is precipitated as barium carbonate by the addition of potassium carbonate and can be separated thus by filtration together with the other insoluble impurities.

The individual salt types can now be obtained from the salt solution by selective crystallization. Here, targeted crystallization recovers the salts at high purity virtually in their entirety in the order potassium nitrate, sodium chloride and finally sodium nitrate. The process parameters can in this case be monitored by means of ion-selective electrodes.

The potassium nitrate can be crystallized out in pure form by cooling the solution to a temperature of between −10 and +20° C., because the solubility of the sodium salts is affected substantially less by temperature and they remain in solution. It is possible to crystalize out 66 percent of the dissolved potassium nitrate from a solution containing, for example, 30 wt. % potassium nitrate, 30 wt. % sodium nitrate and 5 wt. % sodium chloride, by cooling the solution to 0° C. Adherent solution is removed from the crystals by simply washing with potassium nitrate solution. In this way, by selecting the optimal crystallization temperature for the composition of the solution, a potassium nitrate of over 96 percent purity is obtained.

In the next step the water which is supplied with the nitric acid and the hydrogen peroxide solution is evaporated when the solution is concentrated, preferably in a vacuum crystallizer, at temperatures of between 60° and 120° C., and all but a concentration of approximately 3 wt. % of the sodium chloride is crystallized out.

In the final step the sodium nitrate is separated by the addition of concentrated nitric acid. Because, surprisingly, the two nitrate salts behave differently here, it is possible in this way to obtain the sodium nitrate at a very high purity of over 98%, which can even be increased to well over 99% by washing. In order to reduce the sodium nitrate concentration of the solution to from 5 to 15 wt. %, a nitric acid concentration of between 10 and 30 wt. % is necessary, with the higher nitric acid concentrations also bringing about a more pronounced drop in the sodium nitrate concentration. The small amount of chloride which the salt still contains can be converted completely to hydrogen chloride gas by heating the salt with the adherent nitric acid, such that a product is obtained which meets the highest purity requirements after neutralization in a slightly hydroxide-containing sodium nitrate solution.

The diagram in FIG. 1 shows a flow chart for the process according to the invention, showing the sequence of the steps described. After comminution of the used salts, leaching takes place in a starting mixture containing nitric acid and hydrogen peroxide. Barium carbonate and other insoluble solids are separated. The individual salts are separated from the solution by selective crystallization in the order potassium nitrate, sodium chloride, sodium nitrate. The remaining nitric acid solution is recycled for leaching further used salts.

EXAMPLES

The following Examples are given in order to explain the process according to the invention in greater detail:

1. 100 kg of a nitrate-containing used salt mixture were comminuted to a particle size of 10 mm. The used salt was processed in part quantities of 10 kg each. For this purpose the used salt was leached at 55° C. in a starting solution which contained 2.7 kg 65% nitric acid and 4 kg 50% hydrogen peroxide solution. The insoluble impurities were removed from the solution with the aid of polymeric flocculants. The barium was precipitated as barium carbonate by the addition of 0.1 kg potassium carbonate and adjustment of the pH to 9 by the addition of potassium hydroxide. The solution, which was neutralized with nitric acid to pH 7, was then cooled to −5° C., and the potassium nitrate which crystallized out was separated. The sodium chloride was crystallized out by evaporating in each case 4.1 l water at a temperature of 105° C. The aforementioned quantity of nitric acid was added to the concentrated solution, the sodium nitrate which crystallized out as a result was separated at 10° C., and the adherent chloride was removed by heating to 100° C. The aforementioned quantity of hydrogen peroxide was added to the nitric acid solution, and the resulting mixture was recycled for leaching the next batch.

The mass balance for the process was as follows:

| Compound | Percentage contained in used salt | Quantity of product | Product purity |
|---|---|---|---|
| $KNO_3$ | 24.5% | 57.5 kg | 99.0% |
| $KNO_2$ | 30.2% | 0.0 kg | — |
| $NaNO_3$ | 20.6% | 24.5 kg | 97.0% |
| NaCl | 5.1% | 5.0 kg | 98.7% |
| $BaCO_3$ | 2.1% | 2.6 kg | 97.7% |
| $Na_2CO_3$ | 10.5% | 0.0 kg | — |
| NaOH | 2.0% | 0.0 kg | — |
| $Fe_3O_4$ (residue) | 4.8% | 7.0 kg | 32% residual moisture |

2. 100 kg of a nitrate-containing, low nitrite used salt were comminuted to a particle size of 10 mm. The used salt was processed in part quantities of 10 kg each. For this purpose the used salt was leached at 65° C. in a starting mixture which contained 15.1 kg 65% nitric acid and 1.7 kg 50% hydrogen peroxide solution. The insoluble impurities were removed with the aid of polymeric flocculants. The barium was precipitated from the solution as barium carbonate by the addition of 3 g potassium carbonate and sufficient potassium hydroxide to adjust the pH to approximately 9. The solution, which was neutralized with nitric acid to pH 7, was then cooled to 10° C., and the potassium nitrate which crystallized out was separated. The sodium chloride was crystallized out by evaporating 3.4 l water at a temperature of 90° C. The aforementioned quantity of nitric acid was added to the concentrated solution at 30° C., and the adherent chloride was removed, by heating to 100° C., from the resulting sodium nitrate which crystallized out. The aforementioned quantity of hydrogen peroxide was added to the nitric acid solution, and the resulting mixture was recycled for leaching.

The mass balance for the process was as follows:

| Compound | Percentage contained in used salt | Quantity of product | Product purity |
|---|---|---|---|
| $KNO_3$ | 14.1% | 82.8 kg | 99.0% |
| $KNO_2$ | 1.1% | 0.0 kg | — |
| $NaNO_3$ | 0% | 75.7 kg | 99.5% |
| NaCl | 0.2% | 0.2 kg | 96.8% |
| $BaCO_3$ | 0.1% | 0.1 kg | 98.1% |
| $Na_2CO_3$ | 40.6% | 0.0 kg | — |
| NaOH | 4.9% | 0.0 kg | — |
| KOH | 37.4% | 0.0 kg | — |
| $Fe_3O_4$ (residue) | 1.3% | 1.9 kg | 35% residual moisture |

3. 100 kg of a nitrate-containing, potassium-rich used salt were comminuted to a particle size of 10 mm. The used salt was processed in part quantities of 10 kg each. For this purpose the used salt was leached at 65° C. in a starting mixture which contained 2.8 kg 65% nitric acid and 5.2 kg 50% hydrogen peroxide solution. The insoluble impurities were removed with the aid of polymeric flocculants. The barium was precipitated as barium carbonate by the addition of 0.08 kg potassium carbonate and sufficient potassium hydroxide to adjust the pH to approximately 9, and was separated. The solution, which was neutralized with nitric acid to pH 7, was then cooled to −10° C., and the potassium nitrate which crystallized out was separated. The sodium chloride was crystallized out by evaporating 3.4 l water at a temperature of 105° C. The aforementioned quantity of nitric acid was added to the concentrated solution, and the sodium nitrate which crystallized out was separated at a temperature of 10° C. Adherent chloride was then removed from it by heating to 100° C. The aforementioned quantity of hydrogen peroxide was added to the nitric acid solution, and the resulting mixture was recycled for leaching.

The mass balance for the process was as follows:

| Compound | Percentage contained in used salt | Quantity of product | Product purity |
|---|---|---|---|
| $KNO_3$ | 36.2% | 77.9 kg | 99.2% |
| $KNO_2$ | 35.1% | 0.0 kg | — |
| $NaNO_3$ | 9.3% | 33.6 kg | 99.1% |
| NaCl | 3.7% | 3.5 kg | 96.6% |
| $BaCO_3$ | 1.5% | 1.5 kg | 98.7% |
| $Na_2CO_3$ | 10.1% | 0.0 kg | — |
| NaOH | 3.8% | 0.0 kg | — |
| $Fe_3O_4$ (residue) | 0.3% | 0.4 kg | 33% residual moisture |

4. 100 kg of a nitrate-containing, sodium-rich used salt were comminuted to a particle size of 10 mm. The used salt was processed in part quantities of 10 kg each. For this purpose the used salt was leached at 50° C. in a starting mixture which contained 6.8 kg 65% nitric acid and 0.05 kg 50% hydrogen peroxide solution. The insoluble impurities were removed from the solution with the aid of polymeric flocculants. The barium was precipitated as barium carbonate by the addition of 0.03 kg potassium carbonate and sufficient potassium hydroxide to adjust the pH to approximately 9. The solution, which was neutralized with nitric acid to pH 7, was then cooled to 15° C., and the potassium nitrate which crystallized out was separated. The sodium chloride was crystallized out by evaporating 2.4 l water at a temperature of 100° C. The aforementioned quantity of nitric acid was added to the concentrated solution, the sodium nitrate which crystallized out as a result was separated at 50° C., and adherent chloride was removed from it by heating to 100° C. The aforementioned quantity of hydrogen peroxide was added to the nitric acid solution, and the resulting mixture was recycled for leaching.

The mass balance for the process was as follows:

| Compound | Percentage contained in used salt | Quantity of product | Product purity |
|---|---|---|---|
| $KNO_3$ | 15.5% | 16.1 kg | 98.1% |
| $KNO_2$ | 0.2% | 0.0 kg | — |
| $NaNO_3$ | 45.6% | 104.8 kg | 99.5% |
| NaCl | 2.8% | 2.5 kg | 97.9% |
| $BaCO_3$ | 0.5% | 0.5 kg | 98.1% |
| $Na_2CO_3$ | 27.5% | 0.0 kg | — |
| NaOH | 7.1% | 0.0 kg | — |
| $Fe_3O_4$ (residue) | 0.8% | 1.1 kg | 34% residual moisture |

5. 100 kg of the nitrate-containing used salt mixture of Example 1 were processed in a manner which deviated from the parameters which had been found. The salt was comminuted to a particle size of less than 0.5 mm and was leached in part quantities of 10 kg at 65° C. in a starting mixture which contained 2.7 kg 65% nitric acid and 4 kg 50% hydrogen peroxide solution. Some nitrous gas ($No_x$) was given off in this case. The insoluble impurities were removed from the solution with the aid of polymeric flocculants. The barium was precipitated as barium carbonate by the addition of 1 kg potassium carbonate and sufficient potassium hydroxide to adjust the pH to approximately 9.

The solution, which was neutralized with nitric acid to pH 7, was then cooled to 30° C., and the potassium nitrate which crystallized out was separated. After evaporation of 4.1 l water, the sodium chloride was crystallized out at a temperature of 50° C. The aforementioned quantity of nitric acid was added to the concentrated solution, and the sodium nitrate which crystallized out as a result was separated at 0° C. The aforementioned quantity of hydrogen peroxide was added to the nitric acid solution, and the resulting solution was recycled for leaching.

The mass balance for the process was as follows:

| Compound | Percentage contained in used salt | Quantity of product | Product purity |
|---|---|---|---|
| $KNO_3$ | 24.5% | 50.1 kg | 98.2% |
| $KNO_2$ | 30.2% | 0.0 kg | — |
| $NaNO_3$ | 20.6% | 30.5 kg | 85.1% |
| NaCl | 5.1% | 6.5 kg | 73.2% |
| $BaCO_3$ | 2.1% | 2.6 kg | 96.7% |
| $Na_2CO_3$ | 10.5% | 0.0 kg | — |
| NaOH | 2.0% | 0.0 kg | — |
| $Fe_3O_4$ (residue) | 4.8% | 7.1 kg | 32% residual moisture |

This Example shows that when the process deviates from the parameters according to the invention, the salts which are recovered are less pure and nitrogen oxides arise when the used salts are dissolved.

Further variations and modifications of the foregoing will be apparent to those skilled in the art and are intended to be encompassed by the claims appended hereto.

German priority application 196 14 645.3 is relied on and incorporated herein by reference.

We claim:

1. A process for the selective recovery of salt constituents from used salts containing potassium, sodium, nitrates, nitrites chlorides, and hydroxides comprising comminuting a solid used salt mixture to a particle size from 1 to 50 mm, dissolving said comminuted used salt mixture in an aqueous starting solution comprising nitric acid and hydrogen peroxide at from 40° to 90° C. to form a used salt solution, removing insoluble residue from said used salt solution, cooling said used salt solution to from −10° C. to +20° C. to form a potassium nitrate precipitate, evaporating water from said solution at from 60° to 120° C. to concentrate said used salt solution and to form a sodium chloride precipitate, and adding concentrated nitric acid to said concentrated used salt solution to form a sodium nitrate precipitate.

2. The process as defined as in claim 1
wherein said step of removing said insoluble residue from said used salt solution further comprises
adding a flocculent to said used salt solution,
flocculating said used salt solution containing said flocculent, and
filtering said flocculated used salt solution.

3. The process as defined as in claim 1
wherein said potassium nitrate precipitate is separated from said used salt solution before said sodium chloride is precipitated,
wherein said sodium chloride precipitate is separated from said used salt solution before said sodium nitrate is precipitated, and
wherein said sodium nitrate precipitate is separated from said used salt solution.

4. The process as defined as in claim 3 further comprising
adding hydrogen peroxide to said concentrated used salt solution from which said precipitates are separated and recycling said used salt solution for leaching a second used salt mixture.

5. The process as defined as in claim 1 further comprising
removing said precipitated sodium nitrate from said used salt solution, and
heating said precipitated sodium nitrate to remove chloride.

6. The process as defined as in claim 1 wherein said used salts further contain barium further comprising after said dissolving step
adding to said used salt solution a carbonate and an alkali to form a slightly alkaline used salt solution and to form a barium carbonate precipitate.

7. The process as defined as in claim 6
wherein said carbonate is potassium carbonate, and
wherein said alkali is potassium hydroxide.

8. The process as defined as in claim 6
wherein said barium carbonate precipitate is separated from said used salt solution before said potassium nitrate is precipitated.

9. The process as defined as in claim 6 further comprising after precipitating said barium carbonate
neutralizing said used salt solution.

10. The process as defined as in claim 1
wherein said particle size of said solid used salt mixture is from 5 to 10 mm.

11. The process as defined in claim 3 further comprising
washing said potassium nitrate precipitate with a potassium nitrate solution.

12. The process as defined as in claim 1
wherein said evaporating step further comprises using a vacuum crystallizer to evaporate water from said used salt solution.

13. The process as defined as in claim 1 wherein said used salts further contain barium further comprising after removing said insoluble residue
adding to said used salt solution a carbonate and an alkali to form a slightly alkaline used salt solution and to form a barium carbonate precipitate.

14. The process as defined as in claim 13
wherein said barium carbonate precipitate is separated from said used salt solution before said potassium nitrate is precipitated.

* * * * *